Dec. 7, 1965  R. A. SPINUZZA  3,221,936
DRAUGHT BEER CONTROLLING AND DISPENSING SYSTEM
Filed April 3, 1963  3 Sheets-Sheet 1

INVENTOR.
Russell A. Spinuzza
BY
Joseph P. Gastel
ATTORNEY.

Fig. 6.

INVENTOR.
Russell A. Spinuzza
BY
Joseph P. Gastel
ATTORNEY.

United States Patent Office 3,221,936
Patented Dec. 7, 1965

3,221,936
DRAUGHT BEER CONTROLLING AND
DISPENSING SYSTEM
Russell A. Spinuzza, Buffalo, N.Y., assignor of one-fifth
to Samuel C. Battaglia, Buffalo, N.Y., and one-fifth to
Joseph P. Gastel, Tonawanda, N.Y.
Filed Apr. 3, 1963, Ser. No. 270,270
17 Claims. (Cl. 222—54)

The present invention relates to a draught beer dispensing system which insures very accurate control of both the quality and inventory of the beer.

In recent years draught beer sales have gradually decreased in spite of the fact that draught beer is greatly superior to bottled beer in both taste and quality when it is properly dispensed. In order to dispense draught beer properly, the beer must be removed from the keg at a predetermined temperature and pressure, depending on its type. If the pressure is too low the beer which is initially dispensed from the keg will be "wild" or foamy because the internal carbonation of the beer will cause the gasses to be released. Thereafter the remaining beer in the keg will be dispensed "flat" because of the previous release of the carbonation during the initial removal of beer from the keg. Too high a dispensing temperature will cause like results, that is, it will cause the initially drawn beer from a keg to be "wild" or foamy because the temperature of the beer is too high to retain the carbonation, and the remaining beer will be dispensed "flat." Furthermore, in the dispensing of draught beer, excessive agitation of the beer must be avoided because such agitation causes the carbonation to be released from the beer. This results in the beer being dispensed "wild" and, as such, is commercially unacceptable. In short, beer may be characterized as a very erratic organic liquid containing yeast which requires a plurality of factors to be held under close control in order to permit it to be dispensed in commercially acceptable form. These factors, as noted above, include the proper temperature, proper pressure, and minimum of agitation. Thus the foregoing difficulties inherent in the dispensing of draught beer have caused the above-mentioned decrease in demand therefor, notwithstanding that the beer as originally delivered in the keg from the brewery was of perfect commercially acceptable quality.

In addition, because of the erratic nature of draught beer, as noted above, it was difficult to maintain an accurate inventory control. More specifically, while a keg as sealed at the brewery contained, for example, 15½ gallons of beer, which is a mixture of liquids and gasses, a high percent of beer loss was prevalent. More specifiically, the 15½ gallons of beer in the keg could not be accurately dispensed into a number of glasses which totaled the original 15½ gallons. In other words, a tavern owner would have paid for 15½ gallons of beer but because of its erratic nature, may have dispensed only 13 gallons worth of glasses for which he received payment. This caused the dispensing of draught beer to be uneconomical. Furthermore because inventory control of the beer was extremely difficult, for reasons noted above, it was very easy for beer pilferage to occur without detection. This factor also caused the popularity of draught beer to diminish insofar as tavern owners were concerned because they could not realize a predetermined profit on said beer as they could with bottled beer which did not possess the superior qualities of draught beer.

In view of the foregoing factors, the brewing industry was faced with a diminished demand for draught beer. This constituted an economic loss to the breweries because the cost of handling bottled beer including the purchase of bottles, cartons and storage space decreased the profit which could otherwise be realized from the sale of draught beer which required only storage in reusable kegs. Likewise, tavern owners were forced into the sale of low profit bottled beer because of the lack of adequate quality control and inventory control in previous draught beer dispensing systems. In addition, the beer consumer was effectively forced from draught beer to bottled beer not only because of the failure of taverns to supply draught beer for the above-noted reasons but also because draught beer could not be consistently dispensed at a uniform high quality. It is with the overcoming of the foregoing shortcomings prevalent in the brewing field that the present invention is concerned.

It is accordingly the primary object of the present invention to provide an automatic draught beer dispensing system which will always dispense a predetermined amount of draught beer at an optimum predetermined temperature and pressure and at uniform high quality by positively eliminating "wild" or "flat" beer.

Another object of the present invention is to provide a draught beer dispensing system which has an extremely accurate inventory control to thereby insure that a predetermined amount of beer is obtained from each keg.

Still another object of the present invention is to provide a draught beer dispensing system which can be installed as an adjunct of an existing manual draught beer dispensing system to thereby convert the latter into a system which does not have the above-enumerated shortcomings.

A further object of the present invention is to provide a draught beer dispensing system which, when actuated, will not dispense draught beer if the beer is not in condition to be dispensed at a predetermined optimum high quality.

A still further object of the present invention is to provide a draught beer dispensing system which is foolproof in that every dispensing is counted so that there can be no pilferage.

Yet another object of the present invention is to provide a draught beer dispensing system which functions properly independently of the skill of the bartender thereby insuring that the draught beer is always dispensed at a uniform high quality. Other objects and attendant advantages of the present invention will readily be perceived hereafter.

Briefly, the present draught beer dispensing system includes a pressure control arrangement which insures that the beer is dispensed from a keg at the proper pressure. More specifically, the pressure control arrangement includes a constant pressure regulating valve which is interposed between a source of fluid pressure, such as a carbon dioxide cylinder, and the keg from which beer is dispensed. Due to the existence of beer in the keg, the latter possesses a predetermined keg pressure. It can readily be seen that if no external pressure were supplied to the keg, the pressure within the keg would be sufficient to cause beer to be forced therefrom. However after a certain amount of beer was drawn from the keg using only the keg pressure, the remainder of the beer in the keg would be flat and therefore commercially unacceptable because it was the release of carbonation from the beer which caused the build-up of pressure which caused it to be dispensed. Accordingly, the pressure control arrangement of the present invention, by means of the above-mentioned constant pressure regulating valve, causes external fluid pressure to be supplied to the keg, said external fluid pressure being slightly in excess of the normal keg pressure. By virtue of the foregoing arrangement, release of carbonation from the beer is positively prevented and the dispensing of beer from the keg at a proper pressure is assured. The pressure control arrangement also includes an electric circuit and a pressure sensing control which prevents the tap of the dispensing system from dipensing beer if for some reason the pressure in the keg falls below a predetermined optimum dispensing pressure. Furthermore the keg of beer, which is located in a walk-in cooler, or the like, also has a temperature sensing control associated therewith which permits flow of beer through the tap only when the beer is at a proper predetermined dispensing temperature. If either the temperature or the pressure should depart from their required optimum values, either of the controls will prevent beer from being dispensed. The foregoing temperature and pressure controls are preferably located in a locked compartment which prevents anyone from tampering with them, thereby obviating the possibility of dispensing beer improperly. In addition the system includes an electrical circuit having a timer motor and a solenoid actuated beer dispensing tap therein. When a control button associated with the circuit is actuated, the timer motor and the solenoid actuated tap will be energized substantially simultaneously. All of the while that the timer motor is operating to measure a predetermined time interval the tap will remain open and the beer will be forced through the tap at the above-mentioned predetermined temperature and pressure. Since the beer is being dispensed at a predetermined temperature and pressure for a predetermined time a very accurately gauged volume of beer is dispensed. This insures that a keg of beer will provide a predetermined number of glasses. The solenoid actuated tap includes a linkage which causes the tap to fully open instantaneously when the solenoid associated therewith is energized. This causes the beer to be dispensed from the tap without being "wild" or foamy. In this respect, it is to be noted that if the tap were opened gradually the pressure in the conduit leading to the tap would cause the beer to squirt past the valve therein thereby releasing the carbonation and causing "wild" beer to be discharged rather than clear beer. Furthermore, the linkage associated with the solenoid actuated tap is such as to minimize and virtually obviate any shock in the tap during the opening of the valve therein by the solenoid. If this shock were present there would be agitation which would also result in the dispensing of "wild" beer. Furthermore the linkage associated between the solenoid and the tap is such as to close the valve therein substantially instantaneously after a predetermined amount of beer has been dispensed thereby obviating the possibility of "wild" beer resulting from the release a carbonation therefrom if the beer were to squirt past a gradually closing tap. In addition, there is incorporated in the circuit a counter which is actuated every time a glass of beer is dispensed. Thus, a tavern owner has a very close inventory control because he knows the initial contents of a keg, and by subtracting the number of dispensings which have been made, he can determined how much remains in the keg. Furthermore, a tavern owner has the additional inventory control by being able to check his cash receipts against the number of times that beer has been dispensed, thereby reducing the possibility of pilferage. In addition, the above-described circuit operates completely automatically once it has been manually actuated and operates properly irrespective of the skill of the person operating the system so that a uniform high quality draught beer is always dispensed. Furthermore the components of the circuit are arranged so that the dispensing system cannot be tricked, thereby further insuring accurate inventory control in addition to the high quality control described above. The above-described beer dispensing system of the present invention may be installed as an adjacent of a manual draught beer dispensing system and therefore can be used to convert a manual system which is subject to the above-enumerated shortcomings into a system which obviates such shortcomings. In order to effect the above-mentioned conversation, it is merely necessary to remove the existing beer taps and attach a small housing containing various controls to the conduits from which the original taps were removed. In addition, other controls such as the temperature and pressure sensing controls need merely be located in the proper relationship to the beer kegs which are usually located in a walk-in cooler. The foregoing conversion can be effected simply and economically and therefore be utilized to transform a system which previously was uneconomical into one which is economical and which is capable of dispensing draught beer in measured amounts at an optimum uniform high quality. The present invention will be more fully understood when the following portions of the specification are read in conjunction with the accompanying drawings wherein:

Figure 1:
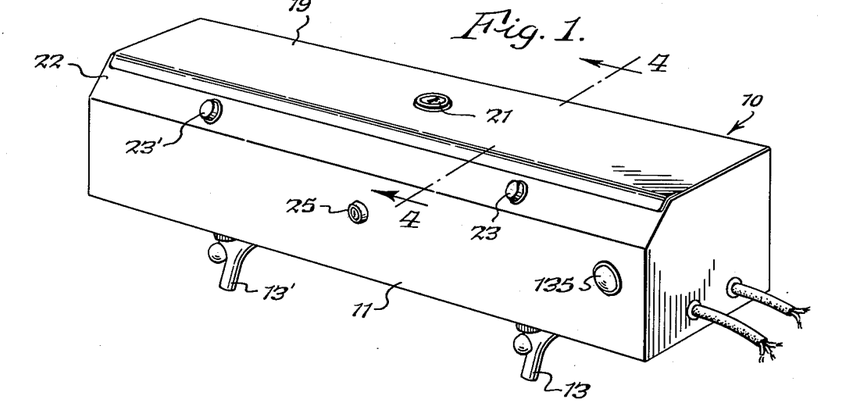
FIG. 1 is a perspective view of a cabinet which is adapted to be installed on the bar in lieu of the conventional manual beer dispensing taps.
Figures 2, 3:
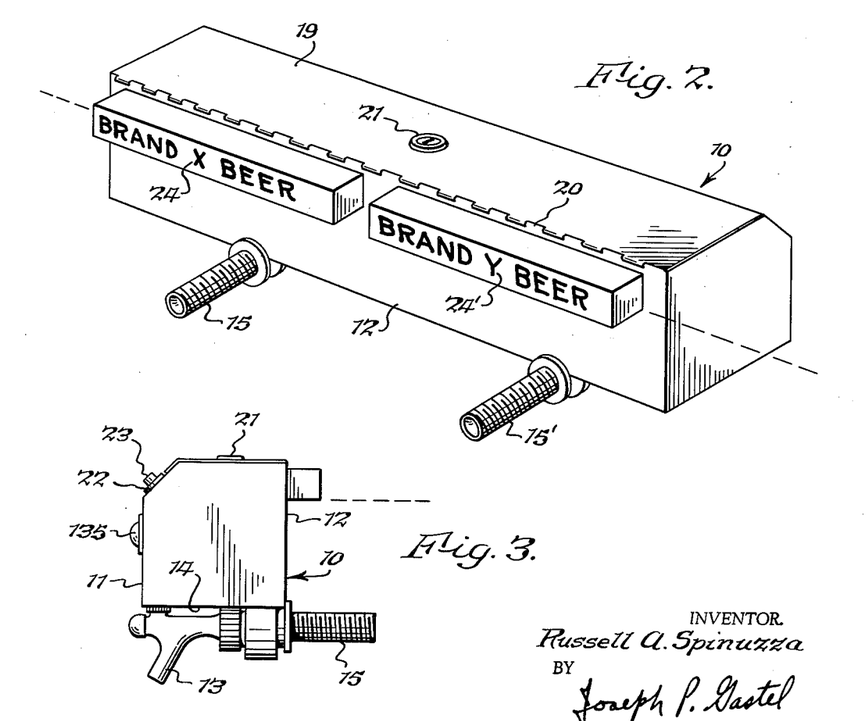
FIG. 2 is a perspective view of the cabinet of FIG. 1 showing the portion of the cabinet which faces the customer.
FIG. 3 is an end elevational view of the cabinet of FIGS. 1 and 2 and showing the relationship of the beer tap to the remainder of the cabinet.

In FIGS. 1, 2, and 3 a cabinet 10 is shown which is adapted to be mounted on a bar after the removal of the conventional draught beer dispensing taps. Cabinet 10 includes a side wall 11 which faces the bartender and a side wall 12 which faces the customer. Beer dispensing taps 13 and 13' protrude from bottom wall 14 of the cabinet. Taps 13 and 13' include threaded conduits 15 and 15', respectively, which are adapted to be attached by suitable plumbing to conduits, such as 16', leading from the beer kegs 16 and 17 (FIG. 6) which are located in walk-in cooler 18. Cabinet 10 includes a hinged top 19 which is secured to side wall 12 by hinge 20. A lock 21 is located in top 19, this lock being used to prevent unauthorized opening of top 19. Protruding from the upper inclined surface 22 of wall 11 are actuating buttons 23 and 23' which are associated with taps 13 and 13', respectively. When one of said buttons is actuated, a measured quantity of beer will be caused to flow through the tap associated therewith at a uniform high quality, as will be more fully explained hereafter. It is also to be noted that wall 12 of cabinet 10 mounts signs 24 and 24'. Whenever a button is actuated to cause the flow of beer through the tap associated therewith, a light will be caused to light up to thereby illuminate the sign associated with the button being actuated to thereby inform the purchaser of the brand of beer which is being dispensed. In the foregoing respect, the name of the beer being dispensed is printed on a translucent plate which permits a light, to be described hereafter, to shine through and thereby provide the above-mentioned visual indication. The components of the improved beer dispensing system which are contained within cabinet 10 can be seen from the schematic showing of FIG. 6, but it will be understood that this housing may contain other components also or contain a lesser number of components than are actually shown. Cabinet 10 also includes a lock 25 on side 11 thereof. The function of lock 25 is to permit an owner of a tavern or the like to deactuate the beer dispensing system by means of a suitable key in the event that he wishes to leave the bar so that unauthorized dispensings cannot be made. The manner in which lock 25 is integrated into the system will become more apparent hereafter.

The improved beer dispensing system of the present invention operates in the following manner: For purposes of explanation at this point, it will be assumed that the beer is at a proper dispensing temperature and pressure. In this respect it will be noted that there are different types of beer and that the optimum dispensing temperature and pressure varies with such types. Accordingly there is incorporated into the instant system a pressure control 26 (FIG. 6) having a switch with a pair of contacts 27 and 28 thereon, the latter contact being mounted on armature 29. Control 26 is adjustable, as by means of knob 30, so that switch contacts 27 and 28 will remain closed only when the pressure of carbon dioxide in conduit 31 is at a predetermined proper dispensing value. If the pressure of carbon dioxide in conduit 31 falls below the proper dispensing value, contacts 27 and 28 will open to prevent the improved system from dispensing beer, as will appear more fully hereafter, because conduit 31' effects communication between conduit 31 and control 26. At this point it will be noted that the system includes a source of carbon dioxide, such as cylinder 32, which is in communication with constant pressure regulating valve 33 through conduit 34. Constant pressure regulating valve 33, which is adjustable, causes the pressure in conduit 34 leading from cylinder 32 to be reduced and to be supplied to conduit 31 at the proper value for dispensing the beer under consideration, regardless of the pressure in $CO_2$ cylinder 32. A gauge 35 is in communication with conduit 31 to provide a visual indication of the pressure in the latter. Constant pressure regulating valve 33 is also in communication with conduit 36 through T 37, conduit 36 in turn leading to carbon dioxide manifold 38 having a plurality of valves thereon. Valve 39 permits communication between carbon dioxide manifold 38 and keg 16 through conduit 40. Valve 41 permits communication between carbon dioxide manifold 38 and keg 17 through conduit 42. In view of the action of constant pressure regulating valve 33, the proper dispensing pressure is caused to be exerted on the beer in kegs 16 and 17 through the above-described pressure circuits. It is to be again noted that constant pressure regulating valve 33 is set to provide pressure to kegs 16 and 17 which is slightly in excess of the normal keg pressure of the kegs, that is, the pressure in the kegs due solely to the existence of beer therein at the proper dispensing temperature.

Figure 6:
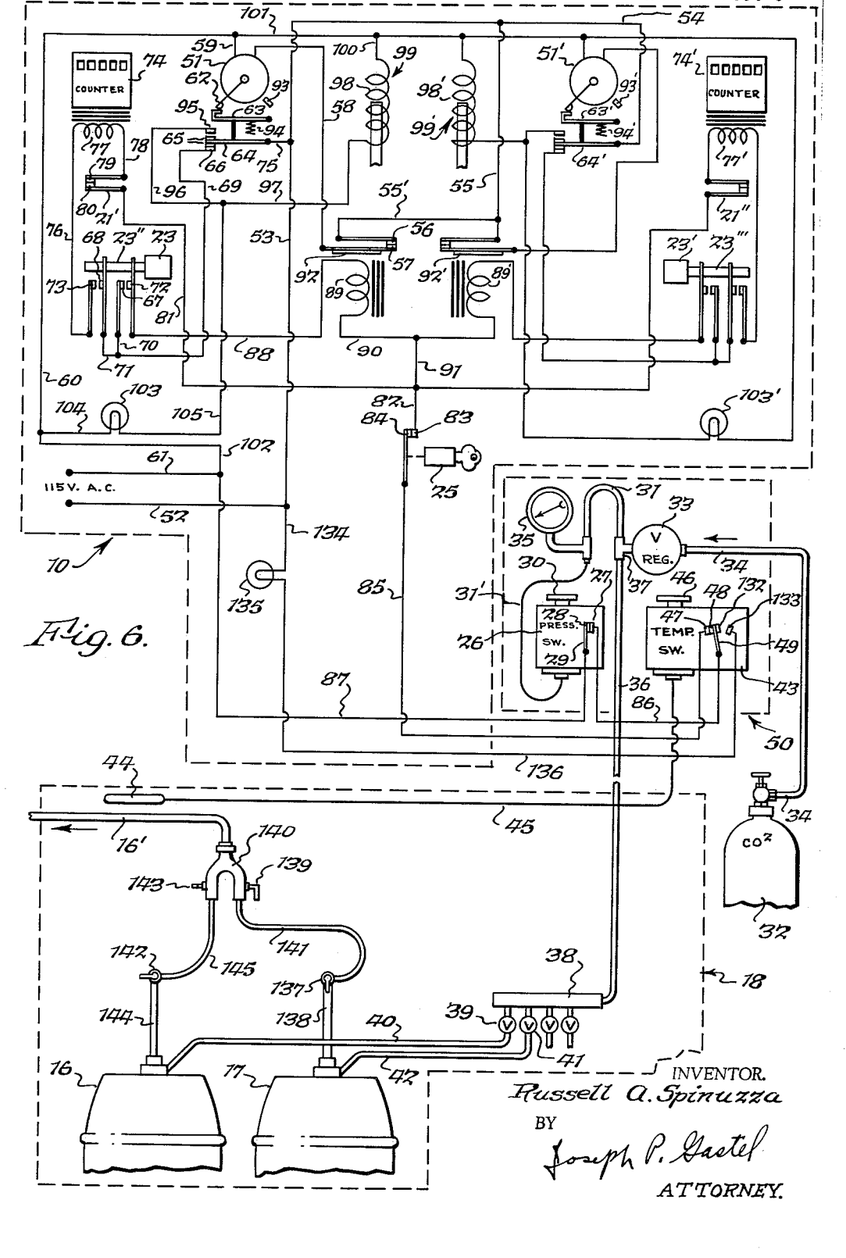
FIG. 6 is a schematic wiring diagram showing the relationship of the various portions of the electrical control circuit to each other and also showing the relationship of certain of the controls to kegs of beer located in a walk-in cooler.

A control 43 is provided for insuring that beer is always dispensed at a proper temperature. Control 43 includes a temperature responsive switch having a temperature sensitive bulb 44 located at a suitable location in walk-in cooler 18. In this respect it will be noted that bulb 44 may be strapped to conduit 16' through which beer flows from the kegs to a suitable tap, or bulb 44 may be located in any other portion of the cooler. The primary consideration is that bulb 44 should provide an accurate source of intelligence of the temperature of the beer which is being dispensed. Bulb 44 is in communication with the remainder of control 43 through conduit 45. An adjustable control 46 is associated with temperature responsive control 43 to permit it to allow the beer dispensing system to be set to operate at any predetermined temperature corresponding to the optimum dispensing temperature for the beer under consideration. When the temperature within walk-in cooler 18 is at the desired value so that bulb 44 will sense the optimum dispensing temperature, contacts 47 and 48 of the switch of control 43 will be in engagement as shown in FIG. 6, contact 48 being mounted on armature 49, which is moved to the position shown in FIG. 6 as a result of the intelligence provided by temperature sensing bulb 44. The above-described temperature and pressure controls are preferably mounted within a housing 50 which may be maintained locked to avoid tampering with said controls. Housing 50 is preferably separate from cabinet 10, but, if desired, the controls shown in housing 50 may be incorporated within cabinet 10, if practical considerations permit this.

Assuming that the improved beer dispensing system of the present invention is in proper condition for dispensing beer, as evidenced by the fact that the pressure control 26 and the temperature control 43 occupy their above-described relationships, all that is necessary for the operator to do is to push button 23 (FIG. 6) to the left. It is to be noted, however, that even before button 23 is pushed, timer motor 51 has a small amount of current flowing therethrough. More specifically, the path of the current is from the 115 volt source through leads 52, 53, 54, 55, and 55', switch contacts 56 and 57, lead 58, timer motor 51, lead 59, leads 60 and 102, and lead 61 back to the 115 volt source. The maintaining of a small amount of current flow through timer motor 51 causes hammer 62 thereof to maintain a force on movable anvil 63 which, through a mechanical linkage is coupled to switch armature 64. Armature 64 has contacts 65 mounted thereon and one of said contacts 65 is in engagement with contact 66 when armature 64 occupies the position shown in FIG. 6, that is, before button 23 is actuated. It will readily be seen that there is no flow of current through closed contacts 65 and 66 before button 23 is moved to the left in FIG. 6 because contact 66 is coupled to contacts 67 and 68 through leads 69, 70, and 71, and the latter contacts are open thereby preventing flow of current through lead 69 while button 23 of the switch is in a non-actuated condition. It is to be noted at this point that timer motor 51 may be of a type manufactured by the Haydon Manufacturing Company, Inc. of Torrington, Connecticut and which is identified as Number 5901–1 "Adjustable Reset Timer." Since this control is commercially available, only the salient features thereof, insofar as operation of the present system is concerned, will be described.

When button 23 of normally open switch 23" is moved to the left in FIG. 6, contact 72 will engage contact 67, and contact 73 will engage contact 68, and the following will occur: Firstly, counter 74, which tabulates the number of dispensings, will be actuated to indicate that a dispensing is being made. More specifically, a circuit will be completed from the 115 volt source through leads 52, 53, and 75, closed contacts 65 and 66, leads 69 and 71, closed contacts 68 and 73, lead 76, solenoid 77 associated with counter 74, lead 78, normally closed contacts 79 and 80 of switch 21', leads 81 and 82, normally closed contacts 83 and 84 associated with key operated switch 25, lead 85, normally closed contacts 47 and 48 in the temperature control 43, lead 86, normally closed contacts 27 and 28 associated with the pressure control 26, and leads 87 and 61 leading back to the source of voltage. At this juncture it is to be noted that the counter 74 will not tabulate a dispensing unless the beer is in proper condition to be dispensed as sensed by the temperature and pressure controls because if either the temperature or pressure is not proper, there can be no completion of the above-described circuit to the counter 74. In the foregoing respect, the circuit through counter solenoid 77 cannot be completed if the contacts 27 and 28 of pressure control 26 are open or if contacts 47 and 48 of temperature control 43 are open. Furthermore a tabulation will not be made unless lock switch 25 (FIGS. 1 and 6) causes contacts 83 and 84 to be closed to permit the system to operate. Furthermore if the cover 19 of cabinet 10 is open so that switch 21' associated with key lock 21 on the cover is open, there will be no tabulation. It is to be noted however that a dispensing of beer can be made without a tabulation, even though switch 21' associated with lock 21 in cover 19 is open, as will be more fully apparent hereafter. The purpose for permitting a dispensing to be made without a tabulation is in the event that the system is being flushed and it is not desired to tabulate the number of dispensings during the flushing period.

Secondly, another circuit is also established upon the pushing of button 23 to the left for the purpose of causing a measured amount of beer to be dispensed. This circuit is from the source of voltage through leads 52, 53, and 75, closed contacts 65 and 66, leads 69 and 70, now closed contacts 67 and 72, lead 88, relay coil 89, leads 90 and 91, contacts 83 and 84, and leads 85 to 87 with the various contacts therebetween back to lead 61 leading to the voltage source. The energization of relay coil 89 will cause armature 92 to be moved downwardly to thereby open normally closed contacts 56 and 57. This causes the above-described holding circuit for timer motor 51 to be opened. When the holding circuit is opened, a spring (not shown) within timer motor 51 will cause hammer 62 to be driven in a clockwise direction until it abuts adjustable stop 93. Timer motor 51 includes a synchronous motor and a gearing arrangement which causes hammer 62 to travel in a counterclockwise direction from adjustable stop 93 after hammer 62 engages stop 93, and therefore the spacing between adjustable stop 93 and the position at which hammer 62 again depresses anvil 63 determines the length of time that timer motor 51 will be in operation.

It will be noted that when hammer 62 moves away from anvil 63, a spring 94 will cause anvil 63 to pivot in a clockwise direction and thereby carry armature 64 from its position in which contacts 65 and 66 were in engagement to a position wherein contacts 65 and 95 are in engagement. It will also be noted that as soon as contacts 65 and 66 terminate their engagement, the circuit to relay coil 89 is broken so that armature 92 is no longer in a condition to cause contacts 56 and 57 to be separated. Therefore the circuit to the timer motor is reestablished after the momentary break thereof to thereby cause the timer motor to operate to cause the hammer 62 to travel from movable stop 93 toward anvil 63. It is to be again noted by varying the position of movable stop 93, the length of time which it takes hammer 62 to return to the condition shown in the drawings will be established. It is to be also noted at this point that since the energization of solenoid coil 89 is effected through normally closed contacts 65 and 66, once button 23 has been actuated so that contacts 65 and 66 separate as a result of the upward movement of anvil 63, repeated pushings of button 23 will be ineffective for energizing solenoid coil 89 which terminates the flow of current to motor 51 when contacts 56 and 57 associated with relay coil 89 open. Furthermore, repeated pushings of button 23 during dispensing of the beer will also be ineffective for completing a circuit through now open contacts 65 and 66 which, by being open, prevent energizing counter 74. Furthermore even if button 23 is maintained in a depressed or actuated condition, there will be no effect on the circuit while beer is being dispensed because contacts 65 and 66 are open.

Beer is dispensed in the following manner after button 23 has been pushed to the left in the above-described manner. After contacts 65 and 95 associated with timer motor 51 are placed in engagement as a result of the clockwise movement of hammer 62, a circuit is established from the 115 volt source through leads 52, 53, and 75, now closed contact 65 and 95, leads 96 and 97, coil 98 of tap actuating solenoid 99, and leads 100, 101, 60, and 102, back to lead 61 leading to the voltage source. Tap actuating solenoid 99 will remain energized to maintain tap 13 open for the period of time that it takes hammer 62 to travel from movable stop 93 to the point where said hammer depresses anvil 63 and causes contacts 65 and 95 to separate. It can thus be seen that since the beer dispensing tap is maintained in an open condition for an accurately gauged predetermined period of time while a predetermined temperature and pressure is maintained on the beer in the system, a measured quantity of beer will be dispensed from the tap 13, which will be described in greater detail hereafter. It is also to be noted that lamp 103 is mounted in parallel across leads 60 and 97 by leads 104 and 105. Thus whenever there is current flow through leads 97 and 60, lamp 103 will be lit. This lamp is mounted behind the "Brand X Beer" sign 24 mounted on the portion of cabinet 10 facing the customer. Thus all of the while that beer is being dispensed there will be a visual indication to the customer of the brand of beer which he is being served. As soon as current flow through leads 97 and 60 ceases, namely, with the de-energization of tap actuating solenoid 99, lamp 103 will be de-energized.

Figures 4, 5, 7:
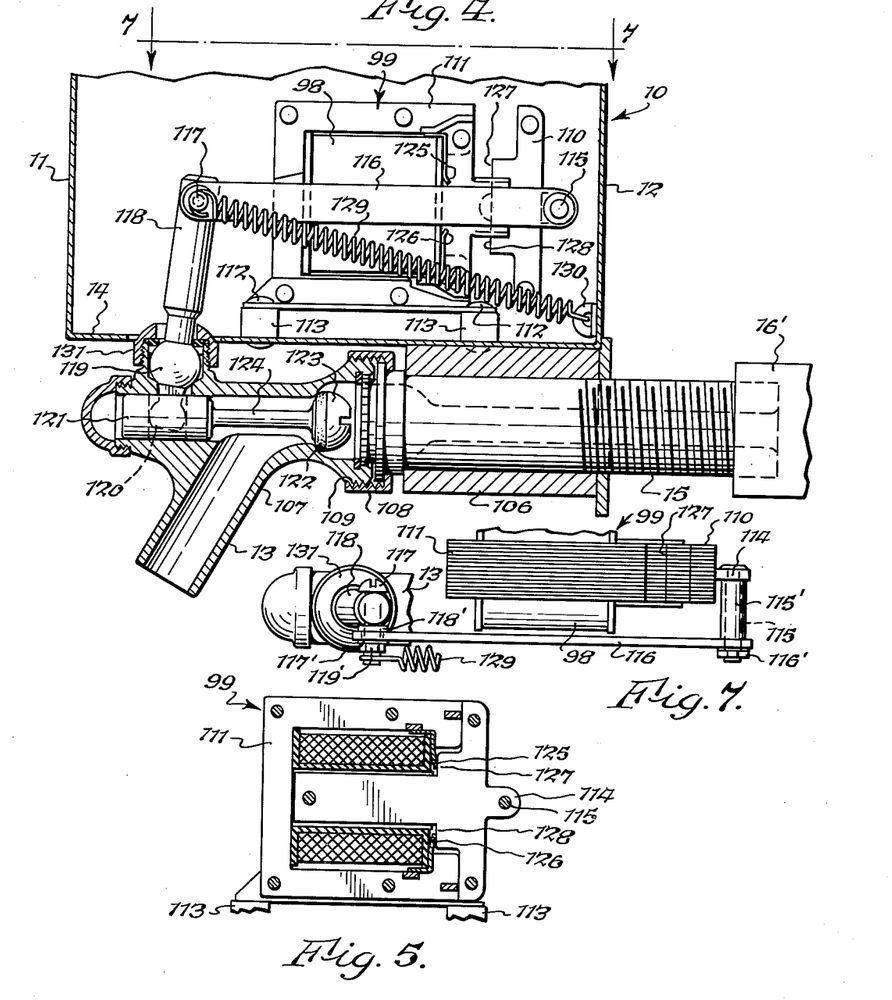
FIG. 4 is a view taken substantially along line 4—4 of FIG. 1 and showing the relationship between the beer tap and the solenoid which is utilized for actuating said beer tap.
FIG. 5 is a view taken through the solenoid of FIG. 4 and showing the relationship between the stator and armature thereof.
FIG. 7 is a detail view of the linkage between the armature of the tap actuating solenoid and the tap itself, this view being taken in the direction of line 7—7 of FIG. 4.

The solenoid actuated beer dispensing tap 13 which is actuated by the above-described circuit and the mechanical linkage associated with said tap are shown in FIGS. 4, 5, and 7. It is to be especially noted that the linkages are of a construction so as to prevent the shock incurred incidental to the actuation of solenoid from being transmitted to tap 13, it being appreciated that if such jarring were to occur there would be an agitation of the beer flowing through tap 13 which in turn would cause it to be dispensed "wild." Tap 13 includes a body portion 106 which may be suitably welded to the underside of bottom 14 of cabinet 10. Spigot 107 is secured to body portion 106 by means of tapped collar 108 which engages threaded outer surface 109 associated with spigot 107. When tap actuating solenoid 99 is energized by having current flow thruogh coil 98 thereof, in the above-described manner, armature 110 will be attracted toward stator 111, that is, it will move from right to left in FIG. 4. As can be seen from FIG. 4, stator 111 is securely mounted on bottom plate 14 of cabinet 10 by means of rivets 112 and grommets 113. A link 114 is pivotally mounted on armature 110, said pivotal mounting permitting a slight floating action of elongated link 115 which has one end thereof rigidly affixed to link 114 and the other end thereof pivotally secured relative to elongated link 116. A collar 115' encircles link 115 and the ends of said collar are in abutting relationship with links 114 and 116 after nut 116' is tightened on link 115. The end of elongated link 116 remote from link 115 is pivotally mounted on link 117 which in turn has the other end thereof secured to stem 118 of beer dispensing tap 13. Washer 118' is interposed between stem 118 and link 116 and washer 117' is interposed between link 116 and nut 119' which is threaded on link 17. The above-described pivotal connections between the solenoid armature and the stem of the tap provide a floating action which prevents the shock incidental to the actuation of the solenoid from being transmitted to tap 13.

When solenoid 99 is energized in the above-described manner, so that armature 110 moves to the left in FIG. 4, link 116 will be caused to moved to the left also, and because of the above-described linkage, stem 118 will be caused to pivot in a counterclockwise direction to thereby cause the ball 119 thereof, which is mounted within tap 13 to pivot and cause the end 120 of stem 118 to move to the right in FIG. 4. End 120 is mounted in a slot within cylindrical piston 121 which slides within a mating cylindrical bore (not numbered) within tap 13. As piston 121 moves to the right, the O ring 122 will be unseated from its seat as valve 123 moves to the right, valve 123 being connected to piston 121 by stem 124. The unseating of valve 123 is substantially instantaneous and there is a minimum of turbulence during this unseating so that the beer is dispensed under the pressure of the system and there is no possibility of the beer squirting past a slowly opening valve. Furthermore the relationship between cylindrical piston 121 and the bore in which it rides causes stem 123 to move with a perfectly rectilinear motion. The fast opening of valve 123 is further enhanced because of the above-described linkage 115, 116, and 117. It can readily be seen that valve stem 118 and link 116 are substantially perpendicular to each other. This causes a maximum valve opening action in a minimum of time to thereby tend to obviate the above-described squirting of beer past the opening valve. Furthermore the pivotal connections enumerated above cause the entire linkage to be essentially self-centering and of a floating nature so that the force of the actuation and the shock experienced during the energization of solenoid 99 will not be transmitted to the valve 123. During the actuation of solenoid 99, shock is further minimized by the existence of springs 125 and 126 which engage the ends 127 and 128 of armature 110 during the terminal portion of the opening of tap 13 to thereby cushion armature 110 as it comes to rest against stator 111.

As noted above, beer will be dispensed through tap 13 all of the while that solenoid 99 remains energized. After the circuit to tap actuating solenoid 99 is broken as a result of hammer 62 of timer motor 51 again engaging and depressing anvil 63, as described above, spring 129, which has one end thereof anchored on bracket 130 on the inside of wall 12 and the other end thereof anchored on link 117, will cause stem 118 to pivot in a clockwise direction in FIG. 4 about the center of ball 119 to thereby cause valve 123 to move to the left until such time as O ring 122 is again seated to terminate the flow of beer. It is to be noted that spring 129 is of a strength so that it will not materially interfere with the operation of solenoid 99, but is also of sufficient strength that it will cause a firm positive rapid seating of valve 123 without causing the latter to jar and thereby preventing the agitation of the beer which remains within the beer tap ready to be subsequently discharged.

The foregoing description has treated the instant beer dispensing system when the temperature and pressure of the beer being dispensed are at proper optimum values. However, it will readily be appreciated that under certain circumstances the temperature may be improper or the pressure may be improper. Under such circumstances, if there were no control to prevent beer from being dispensed, beer could be dispensed but it would not be of commercially acceptable quality. More specifically, as noted above, if the pressure was excessive, the beer would be dispensed "wild" or if the temperature was excessive the initial portion of the beer being dispensed from the keg would also be "wild" because of the fact that the gasses were permitted to be discharged therefrom. Thereafter the remaining portions of beer in the keg would be flat because they did not possess sufficient carbonation. The present system positively prevents beer from being dispensed unless it is in proper condition.

More specifically, assume that temperature sensing bulb 44 senses that the temperature within cooler 18 is too high. This will cause contacts 47 and 48, FIG. 6, to open. Since, as noted above, the circuit to solenoid coil 89 can be completed only when contacts 47 and 48 are closed, pushing of button 23 to the left will be ineffective to in any way energize the beer dispensing circuit consisting of tap solenoid 98 and timer motor 51. Furthermore if contacts 47 and 48 are open, the pushing of button 23 will be ineffective for energizing the counter solenoid 77. Thus beer cannot be dispensed when the temperature is not proper. It is also to be noted that when contacts 47 and 48 of temperature control 43 separate, contacts 132 and 133 will close because of an over-center spring action within the control itself. When this occurs, a circuit will be completed from the voltage source through lead 52, lead 134, trouble light 135, lead 136, closed contacts 132 and 133, lead 86, closed contacts 27 and 28 of pressure switch 26, lead 87 and lead 61 to the voltage source. It is to be noted that trouble light 135 is located on wall 11 of cabinet 10 (FIG. 1) and when trouble light 135 ignites, the bartender will know immediately that the temperature of the beer which is to be dispensed is not proper.

It is also to be noted that if for some reason the carbon dioxide cylinder was not opened after it was installed so that there is insufficient pressure in $CO_2$ line 36 leading to manifold 38, contacts 27 and 28 of pressure switch 26 will be open. Since these contacts are in series with contacts 47 and 48 of the temperature switch, it will readily be appreciated that if button 23 is pushed to the left in FIG. 6 when there is insufficient pressure for dispensing beer that the system will not be actuated because the pushing of button 23 will be ineffective to energize the circuit when said contacts 27 and 28 are open. In the foregoing respect it will be noted that the pressure of the beer in the keg, as it is received from the brewery, is at a predetermined keg pressure. However, constant pressure regulating valve 33 is set at a value slightly in excess of the keg pressure. For example if the keg pressure is 11 p.s.i., valve 33 may be set at 14 p.s.i. Thus contacts 27 and 28 of control 26 will remain closed to permit beer to be dispensed only if the pressure supplied by valve 32 is in excess of the keg pressure. The significance of the foregoing relationship is that the internal pressure of the beer in the keg cannot be used for dispensing the beer. In other words, if the internal pressure of the beer were used to dispense the beer, the carbonation would leave the beer because the gaseous portion thereof would leave the liquid to build up a pressure in the keg, and the beer would be dispensed in a flat condition. By maintaining the $CO_2$ pressure in the keg in excess of the original keg pressure by the use of valve 33, flat beer cannot be dispensed because the beer in the keg cannot lose its carbonation. Furthermore, in the event there should be a loss of $CO_2$ pressure from $CO_2$ tank 32, either because the latter is empty or because it was not properly conncted to line 34, contacts 27 and 28 of control 26 will open to prevent beer from being dispensed. The fact that beer cannot be dispensed when the pressure is not proper prevents the beer in the keg from going "flat" as a result of the release of its internal carbonation.

If desired, a pressure trouble light may be incorporated in the circuit in a similar manner as temperature trouble light 135. In the existing system, however, it will be noted that if both the temperature and pressure have failed for some reason so that the contacts 27 and 28 and the contacts 47 and 48 are open, the trouble light 135 will not light up nor will the actuation of button 23 be effective for energizing the circuit. Thus a bartender who pushes button 23 without obtaining results and without seeing trouble light 135 lit will know that it is either the pressure itself which is inadequate or both the pressure and temperature.

It is to be noted that the $CO_2$ manifold 38 (FIG. 6) posses a plurality of valves leading therefrom. In the present instance, valves 39 and 41 are associated with kegs 16 and 17, respectively, and the system is set up, as shown in FIG. 6, so that when valve 137 in beer conduit 138 and valve 139 in Y 140 are opened, beer will be dispensed from keg 17. When the foregoing occurs while tap 13 is opened, the pressure in the system created by the carbon dioxide in communication with keg 17 will force the beer through conduit 138, valve 137, conduit 141, valve 139, and conduit 16' to said tap. While keg 17 is being used, keg 16 is maintained in reserve by keeping valves 142 and 143 closed. If a bartender wishes to switch kegs, he merely closes valves 137 and 139 and opens valves 142 and 143. When the latter are opened, the carbon dioxide will be permitted to communicate with keg 16 to force the beer therein through conduit 144, valve 142, conduit 145, valve 143, into conduit 16' leading to the tap. The reason for keeping a plurality of kegs in the cooler is to maintain a certain number of them on a stand-by basis and to permit, by the above-described circuits, switching from one keg to another by merely manipulating valves.

It is to be noted that the dispenser shown in FIGS. 1, 2, and 3 possesses a pair of taps 13 and 13'. If desired, each of these taps can dispense the same beer. However it can readily be visualized that different brands of beer can be attached to each of the taps merely by causing a plurality of conduits such as 16' each to lead from each of the kegs to an associated tap. As can be seen from FIG. 6, there is a duplicate circuit disclosed with button 23' corresponding to button 23. In the event that different brands of beer are to be dispensed, the pushing of button 23' for a different brand will actuate a circuit similar to the circuit described above to effect the dispensing of the other brand of beer through the tap associated with button 23', namely, tap 13'. Since the duplicate circuit is the same as the circuit associated with button 33, as described above, it is deemed that a detailed description of the duplicate circuit is not necessary, but can readily be understood from FIG. 6 wherein components corresponding to those described above are designated by the same numerals with an additional prime and wherein the contacts and the leads have not been numbered in the interest of brevity and clarity. It will also be appreciated that any desired number of taps for dispensing different types of beer may be incorporated into the circuitry already described above. In short, if it is desired to dispense seven or eight or even ten brands of beer, it is merely necessary to have an individual beer carrying conduit from each keg to an associated tap and to provide a circuit such as described above for each of the added taps and each of the added conduits.

From FIG. 6 it will be noted that key actuated switch 25 is located between leads 82 and 85, switch 25 also being shown in FIG. 1. Since the contacts 83 and 84 of switch 25 are in series with the contacts of pressure control 26 and temperature control 43 and since the system will not operate to dispense beer when either the pressure switch or temperature switch is open, the system will also not operate to dispense beer when contacts 83 and 84 are open as a result of manipulation of switch 25. As noted above, this permits a tavern owner or the like to manipulate switch 25 to prevent the above-described system from being operated so that unauthorized dispensings of beer cannot be made.

It is also to be noted that the portion of the instant control circuit within cabinet 10, FIGS. 1 and 6, permits a plurality of taps to be operated from single pressure control 26 and single temperature control 43 within housing 50. In this respect while different types of beers have different optimum dispensing temperatures and pressures, it will be appreciated that the temperature control and pressure control may be set for given mean satisfactory values which will permit different types of beer to be dispensed properly. In other words only a single temperature control such as 43 and a single pressure control such as 26 are necessary for use with a plurality of different beer dispensing circuits.

The various controls of the present invention may be satisfactorily set at the following values in order to permit draught beer to be dispensed properly. Control 43 may be set to permit beer to be dispensed when the beer temperature is approximately 35° F. If the beer temperature exceeds the optimum dispensing temperature by more than a few degrees, contacts 47 and 48 of control 43 will open to prevent beer from being dispensed. However, as noted above, the temperature control may be adjusted to permit beer to be dispensed at any desired temperature as required by the tastes of patrons in any particular locality. At the proper dispensing temperature an uptapped keg of draught beer will have an internal keg pressure of 12–15 p.s.i., it being appreciated that the internal keg pressure varies directly with the temperature. In accordance with the present invention, the constant pressure regulating valve 33 is set so that it provides $CO_2$ pressure which is 3–4 pounds in excess of the internal keg pressure at the proper dispensing temperature. Therefore valve 33 will cause $CO_2$ pressure to be supplied at approximately between 15–18 p.s.i. As noted above, the supplying of a higher carbon dioxide pressure than the internal keg pressure prevents the beer in the keg from losing its carbonation. Furthermore, as noted above, the contacts 27 and 28 of pressure control 26 will open if the $CO_2$ pressure in conduit 31 is not sufficient to retain the carbonation in the beer, and when contacts 27 and 28 open, beer cannot be dispensed because the circuit to relay coil 89 is open. In the foregoing respect, contacts 27 and 28 are set so that they will open if the $CO_2$ pressure in conduit 36 drops to a value which is approximately equal to the internal keg pressure, as defined above, to thereby positively prevent loss of carbonation. In addition, the constant pressure regulating valve should be adjusted to provide approximately a half pound per square inch of additional pressure for every foot of rise between the kegs and the beer dispensing tap to insure proper flow of the beer through the conduits. While the system has been described as using a source of $CO_2$ for supplying the pressure for dispensing the beer, it will readily be appreciated that compressed air can also be used.

It is to be noted that $CO_2$ cylinder 32 (FIG. 6) normally has a high pressure regulator valve mounted thereon. This valve has been omitted from FIG. 6 in the interest of clarity. The instant system is intended to be utilized when the above-mentioned high pressure regulator valve, which is not shown, is on the $CO_2$ cylinder. The function of the high pressure regulator valve is to reduce the extremely high pressure of approximately 1100 p.s.i. which exists within cylinder 32 to a value of approximately 100 p.s.i. It is the latter pressure which is subsequently reduced to the above-mentioned value of between 15–18 p.s.i. by constant pressure regulating valve 33 in the manner described above.

It can thus be seen that the present invention is manifestly capable of achieving the above-enumerated objects, and while preferred embodiments of the present invention have been disclosed, it will readily be understood that the present invention is not to be limited thereto, but may be otherwise embodied within the scope of the following claims.

I claim:

1. A control arrangement for dispensing a measured amount of draught beer comprising a beer tap having a valve therein, solenoid means, means operatively coupling said solenoid means and said valve in said tap, a pressure control for sensing the pressure of draught beer which is to be supplied to said tap, a temperature control for sensing the temperature of draught beer which is to be supplied to said tap, timer means, electric circuit means including a starting switch for energizing said solenoid means and thereby causing said solenoid means to open said valve and for causing said timer means to maintain said solenoid means energized for a predetermined period of time while draught beer flows through said open valve at a predetermined pressure and temperature to thereby cause a measured amount of draught beer to be dispensed from said tap, said electric circuit means including both said temperature control and said pressure control to permit said solenoid means to be energized only if the pressure and temperature of said draught beer are at proper dispensing values.

2. A control arrangement for dispensing a measured amount of draught beer comprising a beer tap, valve means operatively associated with said tap for selectively permitting beer to flow through said tap, means including timer means operatively associated with said valve means for maintaining said valve means opened for a predetermined period of time, temperature control means for sensing the temperature of draught beer which is to be dispensed through said tap, pressure control means for sensing the pressure of draught beer which is to be dispensed through said tap, and means operatively associated with said temperature control means and said pressure control means and said valve means for permitting said valve means to be opened only when said temperature and pressure of said draught beer are at proper dispensing values.

3. A control arrangement for dispensing draught beer comprising a tap, valve means for selectively permitting beer to flow through said tap, control means for selectively opening said valve means and adapted to include a pressure responsive control for permitting the flow of draught beer through said tap only when said draught beer is at a desired dispensing pressure, and means actuatable incidental to the dispensing of said draught beer for measuring the quantity of draught beer which is dispensed.

4. A control arrangement for dispensing draught beer from a keg having a predetermined internal keg pressure comprising a source of fluid pressure which is in excess of said internal keg pressure, pressure regulating valve means adapted to be operatively interposed between said source and said keg for supplying fluid pressure to said keg slightly in excess of said keg pressure, a beer tap, means for selectively permitting beer to flow from said keg through said tap at said pressure supplied by said pressure regulating valve means, and control means for preventing the flow of beer from said keg through said tap in the event that said pressure supplied by said pressure regulating valve means falls below a predetermined value.

5. A control arrangement for dispensing draught beer as set forth in claim 4 including timing means operatively associated with said means for selectively permitting beer to flow through said tap for permitting said flow only for a timed interval to thereby cause a measured amount of beer to flow through said tap.

6. A control arrangement for dispensing draught beer as set forth in claim 4 including temperature control means for preventing draught beer from being dispensed from said keg through said tap unless the temperature of said beer is at a proper dispensing value.

7. A control arrangement for dispensing draught beer from a keg as set forth in claim 6 including means for measuring the quantity of beer dispensed from said keg at said dispensing pressure and temperature.

8. A control arrangement for dispensing draught beer from a keg having a predetermined internal keg pressure by the use of an external source of fluid pressure which is in excess of said keg pressure comprising a beer tap, selectively actuatable means for permitting flow through said tap, a constant pressure regulating valve adapted to be operatively interposed between said source of fluid pressure and said keg for causing the fluid pressure at said source to be supplied to said keg at a value slightly in excess of the internal keg pressure to thereby prevent the escape of carbonation from said beer in said keg, control means for preventing the flow of beer from said keg to said tap upon actuation of said means for permitting flow through said tap in the event that said fluid pressure falls below a predetermined value, and timer means for maintaining the flow through said tap for a predetermined period of time after the actuation of said selectively actuatable means to thereby cause a predetermined amount of beer to be dispensed from said tap at said pressure provided by said constant pressure regulating valve.

9. A control arrangement for dispensing draught beer as set forth in claim 8 including temperature control means for preventing draught beer from being dispensed from said keg through said tap unless said beer is at a proper dispensing temperature.

10. A control arrangement for dispensing a measured amount of draught beer comprising a tap, valve means operatively associated with said tap, a stem operatively coupled to said valve means, solenoid means mounted proximate said stem, first circuit means for selectively energizing said solenoid means for opening said valve means, floating linkage means operatively coupling said solenoid means and said stem to prevent the shock incurred incidental to the actuation of said solenoid means from being transmitted to said valve means to thereby prevent agitation of beer proximate said valve means, temperature control means for sensing the temperature of draught beer which is to be supplied to said tap, first pressure control means for supplying external fluid pressure to said keg at a value slightly in excess of the internal keg pressure of said keg to thereby prevent the escape of carbonation of said beer in said keg, second pressure control means for sensing the pressure exerted on the beer in said keg by said external fluid pressure supplied by said source, and second circuit means for preventing said first circuit means from selectively causing said solenoid means to open said valve means in the event that said temperature control means or pressure control means sense a variation in the temperature or pressure, respectively, of said beer in said keg from predetermined dispensing temperatures and pressures, respectively, to thereby prevent said tap from dispensing draught beer from said keg at values which depart from said predetermined dispensing temperatures and pressures.

11. A draught beer dispensing system as set forth in claim 10 including timer means and third circuit means operatively associated with said timer means for causing said solenoid to be actuated for a predetermined period of time incidental to the energization of said first circuit means to thereby cause a predetermined measured amount of draught beer to be dispensed from said keg at said predetermined temperature and pressure.

12. A control arrangement as set forth in claim 11 including means operable in conjunction with said first circuit means for measuring the total quantity of beer dispensed from said keg.

13. A draught beer dispensing system comprising first and second taps, first and second means operatively associated with said first and second taps, respectively, for causing draught beer to flow through each of the taps independently of the flow through the other of said taps, and a single temperature control means and a single pressure control means operatively associated with both said first and second means for preventing the flow of draught beer through either of said taps when the temperature and pressure of said beer departs from an optimum dispensing temperature and pressure but permitting the flow of draught beer through either said first or second taps when said beer is at an optimum dispensing temperature and pressure.

14. A solenoid actuated tap for dispensing draught beer comprising a housing, a spigot attached to said housing, a valve in said housing, a stem attached to said valve, a solenoid mounted proximate said stem and including a stator and an armature, said armature having a rectilinear line of movement and said stem having a pivotal movement about an axis extending substantially perpendicularly to the direction of movement of said armature, an elongated link having first and second ends, a first pivotal connection coupling said first end of said elongated link to said armature, a second pivotal connection coupling said second end of said elongated link to said stem, said first and second pivotal connections being the sole connections existing between said armature and said stem to thereby cause said elongated link and said first and said second pivotal connections to provide a floating linkage for coupling said solenoid to said stem to thereby permit said solenoid to actuate said valve while minimizing the shock incurred incidental to the action of said solenoid to thereby permit draught beer to flow through said spigot without being agitated incidental to the movement of said valve.

15. A solenoid actuated tap as set forth in claim 14 including resilient means operatively interposed between said stator and said armature to absorb the shock of said armature when moving into contact with said stator.

16. A control arrangement for dispensing draught beer comprising a tap, valve means for selectively permitting beer to flow through said tap, control means including a pressure responsive control for permitting the flow of beer through said tap only when the pressure of said beer is at a proper dispensing pressure, and means actuatable incidental to the dispensing of said draught beer for measuring the quantity of draught beer which is dispensed.

17. A control arrangement for dispensing draught beer comprising a tap, valve means for selectively permitting beer to flow through said tap, control means including a temperature control and a pressure control for permitting flow of draught beer through said tap only when both the temperature and pressure of said draught beer are at proper dispensing values, and means actuatable incidental to the dispensing of said draught beer for measuring the quantity of draught beer which is dispensed.

References Cited by the Examiner

UNITED STATES PATENTS

| | | | |
|---|---|---|---|
| 2,834,190 | 5/1958 | Andrews et al. | 222—54 X |
| 2,944,703 | 7/1960 | Womack | 222—504 X |
| 2,949,137 | 8/1960 | Arnett et al. | 222—54 X |
| 2,961,127 | 11/1960 | Reynolds et al. | 222—76 X |
| 3,009,653 | 11/1961 | Hedeman | 222—144.5 X |
| 3,107,705 | 10/1963 | Isserstedt | 222—504 X |

LOUIS J. DEMBO, *Primary Examiner.*